Sept. 23, 1924.
G. H. E. BERTHOLD
ELECTRIC TERMINAL
Filed April 3, 1923
1,509,224
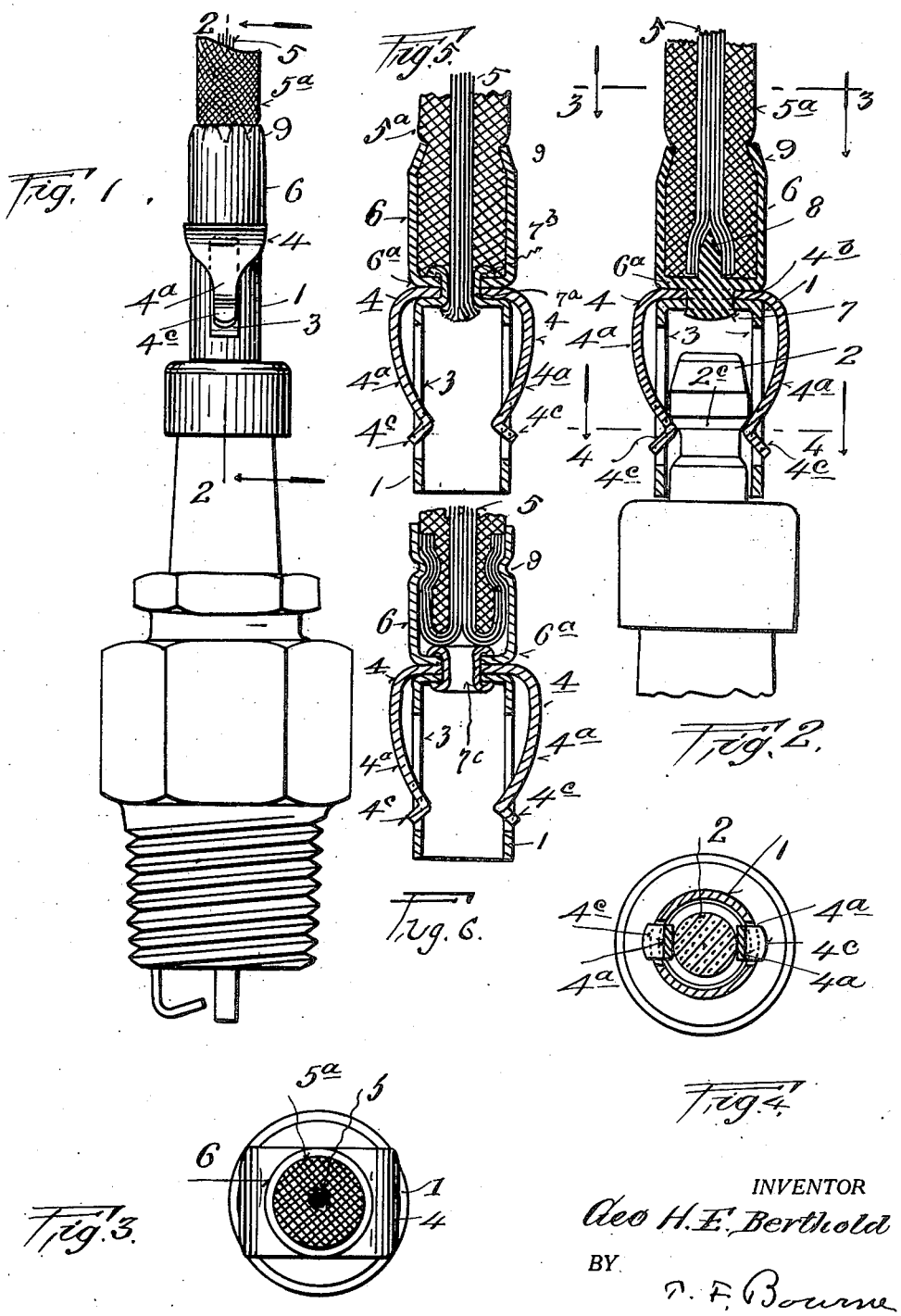
INVENTOR
Geo H. E. Berthold
BY
T. F. Bourne
HIS ATTORNEY Patented Sept. 23, 1924.

1,509,224

UNITED STATES PATENT OFFICE.

GEORGE H. E. BERTHOLD, OF EAST ORANGE, NEW JERSEY, ASSIGNOR TO RAJAH AUTO SUPPLY CO., OF BLOOMFIELD, NEW JERSEY, A CORPORATION OF NEW YORK.

ELECTRIC TERMINAL.

Application filed April 3, 1923. Serial No. 629,563.

*To all whom it may concern:*

Be it known that I, GEORGE H. E. BERTHOLD, a citizen of the United States, and resident of East Orange, in the county of Essex and State of New Jersey, have invented certain new and useful Improvements in Electric Terminals, of which the following is a specification.

The object of my invention is to provide a simple and efficient terminal or attachment device adapted to be secured to insulated electrical conductors and to be readily connected with and detached from an electrode, post or other element of an electric circuit, having means to make good electrical contact with the latter and be maintained in a desired position thereon to avoid danger of becoming detached or making poor connection.

In carrying out my invention I provide a tubular member or ferrule having slots and adapted to fit upon or receive an electrode or other electric circuit terminal, a spring clip associated with said ferrule and having reslient spaced arms adapted to pass through said slots to engage the electrode, with means to attach said ferrule to an electric conductor.

My invention also comprises novel details of improvement that will be more fully hereinafter set forth and then pointed out in the claims.

Reference is to be had to the accompanying drawings forming a part hereof, wherein—

Fig. 1 is a side view of a spark plug equipped with my improved terminal, on an exaggerated scale;

Fig. 2 is a section on line 2, 2, in Fig. 1;

Figs. 3 and 4 are sections respectively on lines 3, 3, and 4, 4, in Fig. 2; and

Figs. 5 and 6 are sectional details of modifications.

Similar numerals of reference indicate corresponding parts in the several views.

At 1 is a sleeve or ferrule open at one end adapted to fit over or receive an electrode, post or other electric terminal 2. The sleeve or ferrule 1 is shown slotted on opposite sides at 3, and at 4 is a clip having one or more spring-like arms $4^a$, preferably two opposing arms, adapted to pass through the slots 3 to engage the electrode or terminal 2. The cross bar or base portion $4^b$ of clip 4 is secured over the closed outer end of sleeve or ferrule 1 and said parts are attached to an electric conductor 5. In the example illustrated a sleeve 6 is provided with a stud or projection 7 that extends through registering holes in clip 4 and ferrule 1, the inner end of said stud being riveted over to secure the parts 1, 4 and 6 securely together so that the base $4^b$ of the clip is securely clamped between the closed outer end of ferrule 1 and the closed base or end $6^a$ of sleeve 6. In Fig. 2 the sleeve 6 is shown provided with an interior tapered projection 8 which enters the cable wires of the conductor 5 to make electrical contact therewith, the insulation $5^a$ of the conductor fitting within the sleeve 6. To retain the sleeve on the insulation the free end of the sleeve may be crimped or dented into the insulation, as shown at 9, or secured in any other desired way.

Instead of having a solid stud or projection 7 extending from sleeve 6, a stud or projection $7^a$ may extend from ferrule 1 to secure the parts 4 and 6 thereto, as illustrated in Fig. 5. Instead of utilizing projection 8 to make contact with the electric cable the latter may be secured to either the ferrule 1 or sleeve 6 in any desired manner. In Fig. 5 the projection $7^a$ is tubular, in the nature of an eyelet, passing through the parts 4 and $6^a$, the free end $7^b$ being riveted over against the closed end $6^a$ of sleeve 6, the conductor wire or cable passing through said projection and being soldered thereto or to ferrule 1.

Instead of soldering the conductor to the ferrule the ends of the wires of the conductor or cable may be bent back around the insulation within and bearing against the sleeve 6, the denting of the sleeve at 9 making electrical contact with the conductor, as in Fig. 6. Instead of connecting the parts 1, 4 and 6 together by projections that are integral with one of said parts they may be connected together by means of a hollow rivet or eyelet, as shown at $7^c$ in Fig. 6.

My improved terminal, by the means described, is securely attached to the end of a conductor so that the ferrule and clip maintain a similar position with respect to the latter. When the terminal is to be used it is merely necessary to slide the ferrule over the electrode or terminal 2, whereupon the arms $4^a$ of the clip will expand as required to receive the electrode and will clamp the same firmly, while at the same time the ferrule bears against the electrode to maintain the clip in position on the electrode and in firm contact therewith, so that the clip will not become loosened or swing unduly with respect to the electrode. In the form illustrated, where my improved terminal is adapted to be applied to the terminal or electrode 2 of a spark plug, the flaring ends 4$^c$ of the jaws 4$^a$ of the clip will readily slide along the electrode to engage its shoulder 2$^c$, and owing to the bow-like formation of the arms of the clips they will readily slide off the electrode when the terminal is pulled therefrom. Since the free ends of the arms of the clip normally project into the ferrule through its slots said ends of the clip are protected by the ferrule, whereby danger of spreading said arms accidentally is avoided.

My improved terminal is simple and cheap to construct and efficient in use, readily applied to and removed from an electrode or electric terminal, and not liable to get out of order.

Having now described my invention what I claim is:

1. An electric terminal comprising a ferrule provided with slots, and having an open end, a clip secured to the opposite end of the ferrule and having spring-like arms located outside of the ferrule and extending into said slots, and means to secure the terminal to an electric conductor with the ferrule disposed axially thereof.

2. An electric terminal comprising a ferrule having an open end and opposing slots, a clip carried by the opposite end of the ferrule and provided with opposing spring-like arms located outside of the ferrule and entering said slots, and means to secure the terminal to an electric conductor with the ferrule disposed axially thereof.

3. An electric terminal comprising a ferrule having a closed end, an open end, and a slot between said ends, a clip having a spring-like arm without the ferrule and extending into its slot, a sleeve for attachment to an electric conductor, said sleeve being located on the side of the clip opposite the ferrule, and means to secure said ferrule, clip and sleeve together, said sleeve being provided with means to make electrical contact with the conductor.

4. An electric terminal comprising a ferrule having an open end and spaced slots in its wall, a clip upon the closed end of the ferrule provided with spaced spring-like arms extending without the ferrule and into said slots, a sleeve having a base upon said clip, and means to secure said ferrule, clip and sleeve together in electrical contact, said sleeve having an interior projection to engage a conductor, the sleeve being adapted to receive insulation upon the conductor.

GEORGE H. E. BERTHOLD.